(12) United States Patent
Strauser

(10) Patent No.: US 8,116,077 B1
(45) Date of Patent: Feb. 14, 2012

(54) DIGITAL MUSIC PLAYER CRADLE ATTACHMENT

(76) Inventor: Jack Strauser, Pinellas Park, FL (US)

( * ) Notice: Subject to any disclaimer, the term of this patent is extended or adjusted under 35 U.S.C. 154(b) by 227 days.

(21) Appl. No.: 12/699,078

(22) Filed: Feb. 3, 2010

Related U.S. Application Data

(63) Continuation-in-part of application No. 11/676,850, filed on Feb. 20, 2007, now Pat. No. 7,742,293.

(51) Int. Cl.
*H05K 5/00* (2006.01)
*H05K 7/00* (2006.01)

(52) U.S. Cl. .................... 361/679.41; 361/679.4

(58) Field of Classification Search ............ 361/679.01, 361/679.4, 679.41
See application file for complete search history.

(56) References Cited

U.S. PATENT DOCUMENTS

| | | |
|---|---|---|
| D513,938 S | 1/2006 | Griffin |
| 2004/0150944 A1 | 8/2004 | Byrne et al. |
| 2006/0116009 A1 | 6/2006 | Langberg et al. |
| 2006/0127034 A1 | 6/2006 | Brooking et al. |
| 2006/0181840 A1* | 8/2006 | Cvetko ............... 361/679 |
| 2006/0250764 A1* | 11/2006 | Howarth et al. ......... 361/683 |
| 2008/0307144 A1* | 12/2008 | Minoo ................ 710/304 |

* cited by examiner

*Primary Examiner* — Anthony Haughton
(74) *Attorney, Agent, or Firm* — Larson & Larson, P.A.; Frank Liebenow; Justin Miller

(57) ABSTRACT

A digital music player cradle for sequentially supporting multiple digital music players includes a base with a cavity in an upper surface. The cavity accepts an end portion of a largest digital music player of the multiple digital music players. A support wall extends from the upper surface of the base for supporting one of the digital music players at a time. A plurality of ledges is within the cavity. The ledges are of decreasing size towards the bottom of the cavity and each ledge is sized to hold a different one of the multiple digital music players. The digital music player cradle has fasteners for attaching to a device such as a karaoke system.

20 Claims, 7 Drawing Sheets

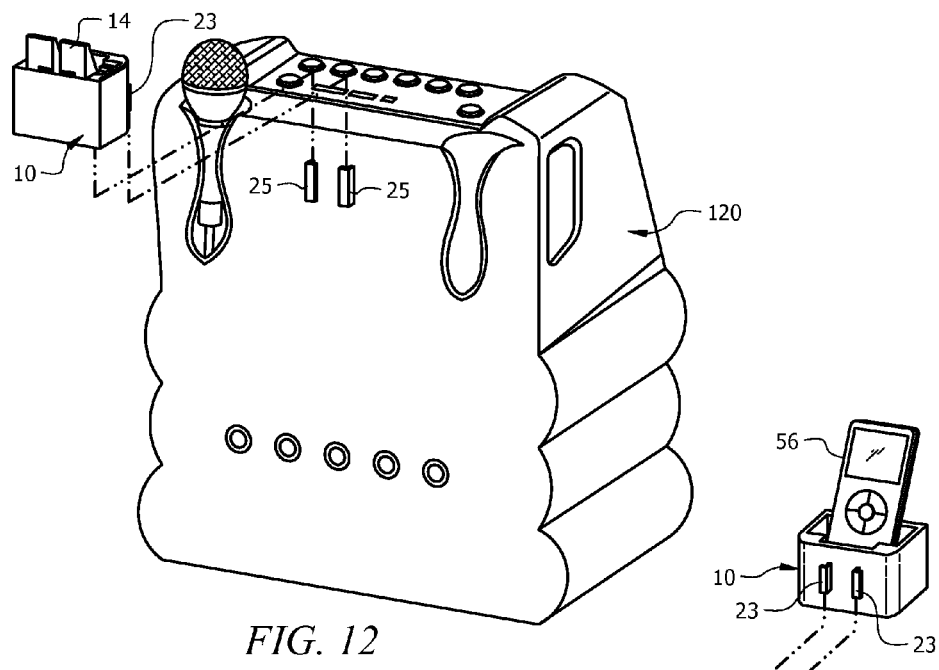
FIG. 12
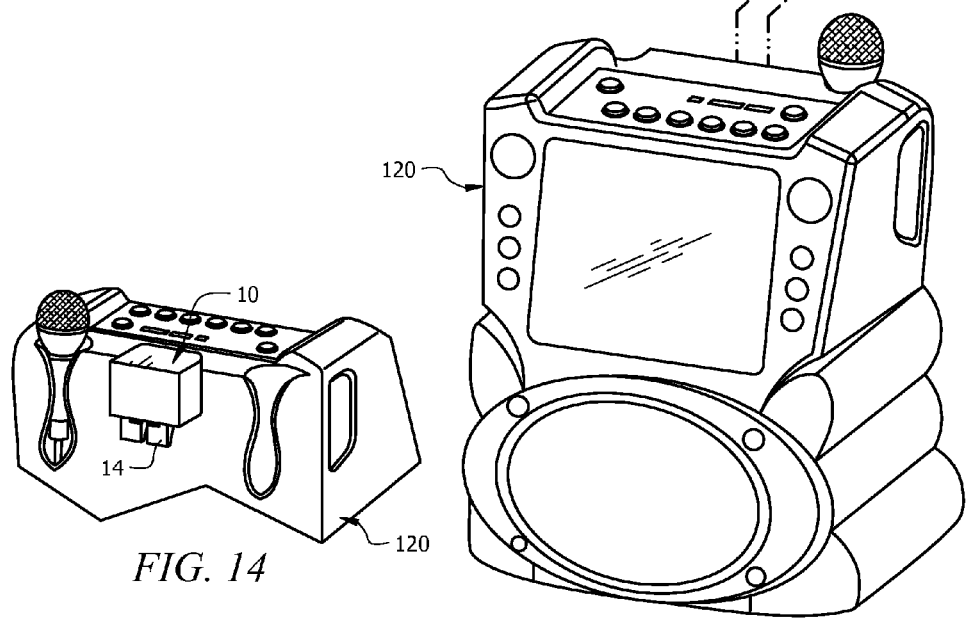
FIG. 14
FIG. 13

DIGITAL MUSIC PLAYER CRADLE ATTACHMENT

RELATED APPLICATION

This application is a Continuation-in-Part of U.S. patent application Ser. No. 11/676,850, titled "ADAPTABLE DIGITAL MUSIC PLAYER CRADLE," filed Feb. 20, 2007.

FIELD

This invention relates to Karaoke systems and more particularly to a cradle for supporting and holding one of a selection of music players onto a music or Karaoke system.

BACKGROUND

Digital music players are well known in the industry. Generally, these devices have internal storage for storing songs in digital format, a display for providing user feedback and controls for accepting user inputs to direct the music player to convert one or more of the songs from digital format into analog so that the user can listen to the audio with headphones or through an amplifier and speakers.

Predominately, portable music players utilize songs or other audio content in the form of compressed digitized audio files (e.g., content). Music or other audio is converted to digital by an audio-to-digital converter (ADC), then sampled at a given rate, then compressed using a particular encoding standard such as MP3 (MPEG-2 layer 3) or WMA (Windows® Media Audio).

When used in a portable mode, digital music players are predominately used with earphones for a single user's pleasure. Although portable music players are perfect for use in a portable mode such as when walking or exercising, often such players are used in a stationary mode. There are two primary modes of stationary use: connected to an audio system for amplification and reproduction of music from the digital music player and connected to a computer for management and loading of content.

For connection to an audio system, often the audio input of the audio system is connected directly to the headphone jack of the digital music player and the music normally heard on the user's headphone is amplified and delivered to one or more speakers for the user's listening pleasure. Alternately, a connector, usually located on the bottom of the digital music player, interfaces to a mating connector and some of the pins on the connector carry the analog audio output from the digital music player to a cable that connects to the input of the audio system. There have been several docking systems designed for popular digital music players such as those marketed by Apple corporation. Additionally, some manufacturers market audio systems with docking cradles for specific digital music player such as the Apple Corporation iPod®. For example, Apple Corporation markets an alarm clock and amplified speakers called "XtremeMac Luna Speakers." The "XtremeMac Luna Speakers" have a docking cradle that accepts an iPod®, but users with different digital music players cannot use the docking cradle and must use this device's auxiliary audio input connected to the earphone jack of their music player. When connected in this fashion, the digital music player does not receive power from the audio system and is not supported or protected from damage or scratching.

For connection to a computer system, often a data cable is connected to the connector located on the bottom of the digital music player. Often, some of the pins on this connector include power pins to power the digital music player while connected to the computer as well as data pins for transferring digitized audio files to the digital music player from the computer. Often, the data pins conform to a computer interface standard such as Universal Serial Bus (USB), a standard supported by many existing computers. Such a standard often provides for two-way data transmission as well as power, usually 5 volts, DC.

There have been several computer connection docking systems designed for certain popular digital music players such as those marketed by Apple Corporation. For example, Apple Corporation markets an iPod® Nano docking station for supporting the iPod® Nano and connecting it to a computer system. Unfortunately, this docking station only accepts the iPod® Nano and no other digital music players, not even other digital music players from the same manufacturer. A user having two different digital music players would need two different docking cradles.

Some docking cradles, such as those provided with digital music player from Apple Corporation, hold more than one variety of digital music players. For example the Apple Universal iPod® Dock holds any of the iPod® Nano, 30 GB iPod®, 80 GB iPod®, etc. It does this with five different adapter inserts, requiring the user to swap inserts depending upon which digital music player they are currently using.

Lately, many Karaoke systems have begun using digital music players as a source of Karaoke content. Some systems have input jacks for accepting audio content that is amplified and presented on speakers. There are no prior systems that have adapters that have holders that accept multiple sizes of digital music players.

What is needed is a Karaoke system with a removable digital music player cradle that supports more than one class of music player.

SUMMARY OF THE INVENTION

In one embodiment, a digital music player cradle for supporting multiple digital music players is disclosed including a base that has a cavity in an upper surface that accepts an end portion of a largest digital music player of the multiple digital music players. The base has a support wall extending from an upper rear surface for supporting one of the digital music players and a plurality of ledges within the cavity. The ledges form decreasing sized openings towards a bottom of the cavity, whereas each ledge is sized corresponding to hold a different one of the multiple digital music players. An attachment mechanism on a front surface of the base connects with a mating attachment mechanism on the sound system, thereby holding the digital music player cradle to the sound system.

In another embodiment, a method of supporting multiple digital music players is disclosed including providing a digital music player cradle for supporting any one digital music player of the multiple digital music players. The digital music player cradle has a base with a cavity in an upper surface. The cavity accepts and holds an end portion of a largest digital music player of the multiple digital music players. A support wall extends from an upper rear surface of the base for supporting one of the multiple digital music players at a time and a plurality of ledges are disposed within the cavity. The ledges form decreasing sized openings towards a bottom of the cavity, whereas each ledge is sized to hold a different one of the multiple digital music players. There is an attachment mechanism on a front surface of the base for connecting with a mating attachment mechanism on the sound system, thereby holding the digital music player cradle to the sound system. The method continues with interfacing the attachment mechanism to the mating attachment mechanism, thereby attaching the base of the digital music player cradle to the sound system then connecting a first digital music player of the multiple digital music players to a first end of a data cable and a second end of the data cable to the sound system. A first end of the first digital music player is inserted into the cavity within a first ledge and a back side of the first digital music player rests against the support wall. Next, the first digital music player is removed from the cavity and cable; and a second digital music player of the multiple digital music players is connected to the first end of the data cable. The second digital music player has a different size than the first digital music player. Next, a first end of the second digital music player is inserted into the cavity within a different ledge and a back side of the second digital music player rests against the support wall.

In another embodiment, a digital music player cradle for supporting multiple digital music players is disclosed including a base with an area for accepting an end portion of any one of the multiple digital music players and a support extending from an upper surface of the base for resting the digital music player. Steps (ledges) are provided for supporting the multiple digital music players within the area for supporting the digital music player, the steps include ledges forming decreasing sized oepnings towards a bottom of the area for supporting the digital music player and each ledge is sized to hold a different one of the multiple digital music players. The digital music player cradle removably attaches to a sound system with an attachment mechanism (key/key-hole, brackets/slots, hooks/loops, etc).

BRIEF DESCRIPTION OF THE DRAWINGS

The invention can be best understood by those having ordinary skill in the art by reference to the following detailed description when considered in conjunction with the accompanying drawings in which:

FIG. 12 illustrates a rear isometric view of a Karaoke system showing the attachment of a digital music player cradle by the second exemplary attachment mechanism.

FIG. 13 illustrates a front isometric view of a Karaoke system showing the attachment of a digital music player cradle by the second exemplary attachment mechanism.

FIG. 14 illustrates a rear isometric view of a Karaoke system showing the attachment of a digital music player cradle in an alternate position for storage when not in use.

DETAILED DESCRIPTION

Figure 1:
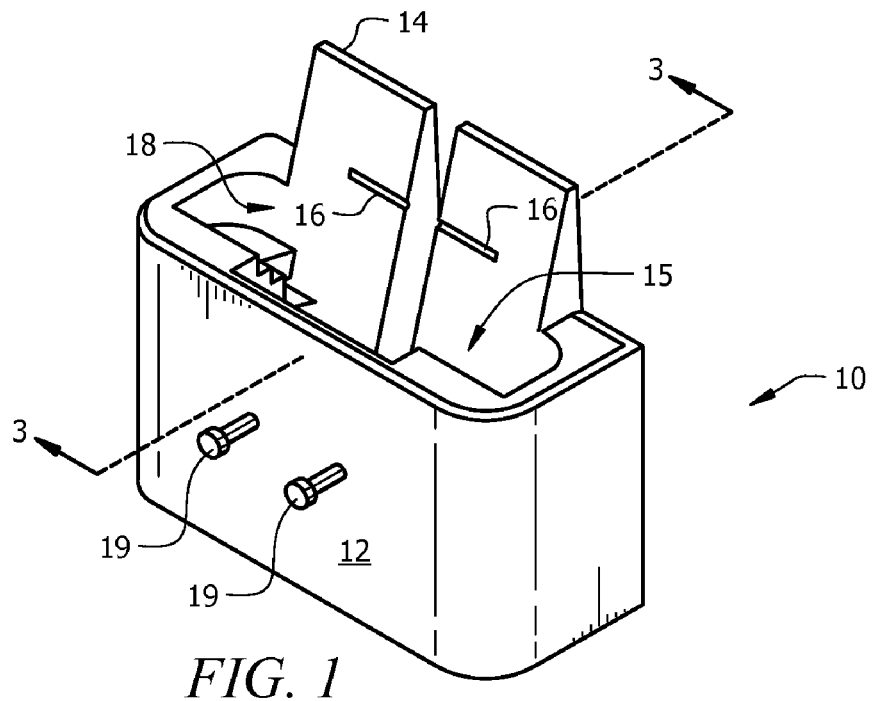
FIG. 1 illustrates an isometric view of a digital music player cradle with one exemplary attachment mechanism.

Reference will now be made in detail to the presently preferred embodiments of the invention, examples of which are illustrated in the accompanying drawings. Throughout the following detailed description, the same reference numerals refer to the same elements in all figures. The following description includes examples of digital music players. Many different digital music players are currently on the market. These devices generally have persistent storage for storing audio content (music) such as a micro-hard disk or flash memory. Under user control, the audio files are retrieved, uncompressed and converted to analog audio. The analog audio signal is often emitted in a 3.5 mm stereo headphone jack for the user to connect headphones or other reproduction devices. Some devices have a specialized data/power connector for connecting to a source of power and/or transferring data (e.g. music) to the digital music player. Many digital music players have graphical displays and, in such, when part of the data transferred includes text and/or images, the text and/or images are selectively displayed on the graphical display. For Karaoke content, the data transferred includes lyrics linked to music and, during playback of the music, the lyrics are displayed on the graphical display.

Throughout the description, the term sound system, Karaoke system, etc, describe a system that generally operates in conjunction with the digital music player to, for example, amplify the sound from the digital music player, synchronize music/data with the digital music player, mix sound from a microphone with the sound from the digital music player, etc. Many such systems include a processor to perform these functions and other functions. In some embodiments, the sound system is a computer system with, for example, speakers and a microphone connected.

Referring to FIG. 1, an isometric view of a digital music player cradle with a first type of attachment mechanism is described. The digital music player cradle 10 accommodates a variety of digital music players of various widths and thicknesses, thereby eliminating the need for multiple cradles or adapter inserts as provided in the past. The digital music player cradle 10 has a base 12, a cavity 18 for containing an end of the digital music player and a support wall 14 for supporting the digital music player, preferably on a slight slant towards the rear. In some embodiments, a pair of front clip indentations 16 is provided to hold a clip-on micro-sized music player (not shown). For attaching to a playback system, such as a Karaoke system, mounting posts 19 are attached to the front surface of the base 12. These mounting posts 19 slide into key holes 21 (see FIG. 10) on the playback system; for example, on the Karaoke system 110 (see FIG. 10).

Figure 1A:
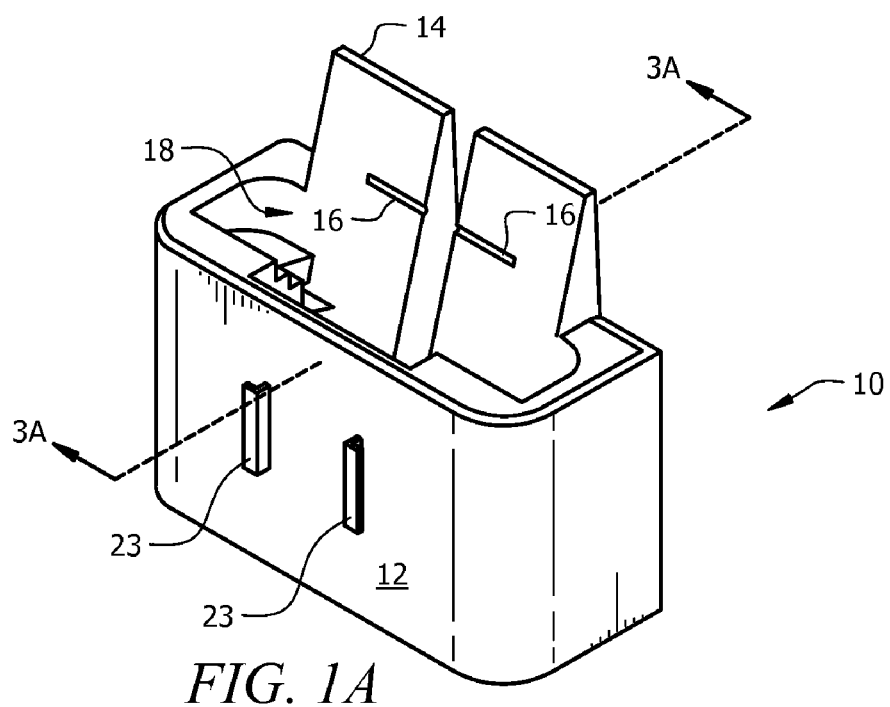
FIG. 1A illustrates an isometric view of a digital music player cradle with another exemplary attachment mechanism.

Referring to FIG. 1A, an isometric view of a digital music player cradle 10 with a second type of attachment mechanism is described. The digital music player cradle 10 accommodates a variety of digital music players of various widths and thicknesses, thereby eliminating the need for multiple cradles or adapter inserts as provided in the past. The digital music player cradle 10 has a base 12, a cavity 18 for containing an end of the digital music player and a support wall 14 for supporting the digital music player, preferably on a slight slant towards the rear. In some embodiments, a pair of front clip indentations 16 is provided to hold a clip-on micro-sized music player (not shown). For attaching to a playback system, such as a Karaoke system, mounting brackets 23 are attached to the front surface of the base 12. These mounting brackets 23 slide into mating mounting slots 25 (see FIG. 12) on the playback system; for example, on the Karaoke system 120 (see FIG. 12).

In FIGS. 1 and 1A, two different types of exemplary attachment mechanisms 19/21/23/25 are shown. Many other types of attachment mechanisms are anticipated including, but not limited to, hook and loop material, horizontal clips, snaps, etc. It is preferred, though not required, that the attachment mechanism provide for attachment in an upright position (as shown in FIGS. 8-13) and in an inverted position (as shown in FIG. 14).

Figure 2:
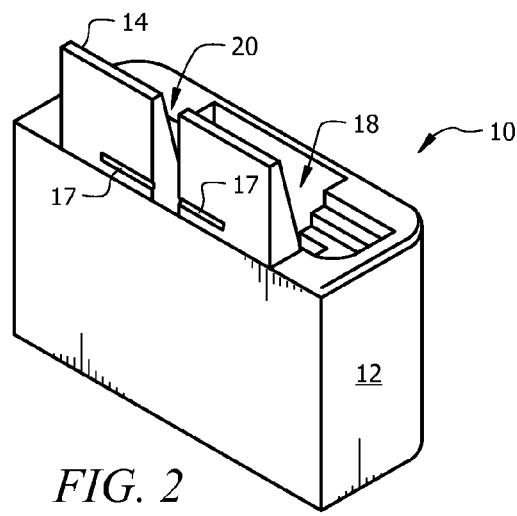
FIG. 2 illustrates an isometric view of a digital music player cradle from the back.

Referring to FIG. 2, an isometric view of a digital music player cradle 10 from the back is described. Again, the digital music player cradle 10 accommodates a variety of digital music players of various widths and thicknesses without requiring inserts or removable sections. The digital music player cradle 10 has a base 12, a cavity 18 for containing an end of the digital music player (not shown) and a support wall 14 for supporting the digital music player, preferably on a slight slant towards the rear. In some embodiments, a pair of rear clip indentations 17 is provided to hold a clip-on micro-sized music player (not shown).

In some embodiments, a cable trough 20 is provided to route a data cable from the digital music player (not shown). Often, the digital music player (not shown) has a connector for connecting to a computer for power and/or for transferring content through the data cable. As an example, many current digital music players have a connector for connecting to a Universal Serial Bus (USB) cable.

Figure 3:
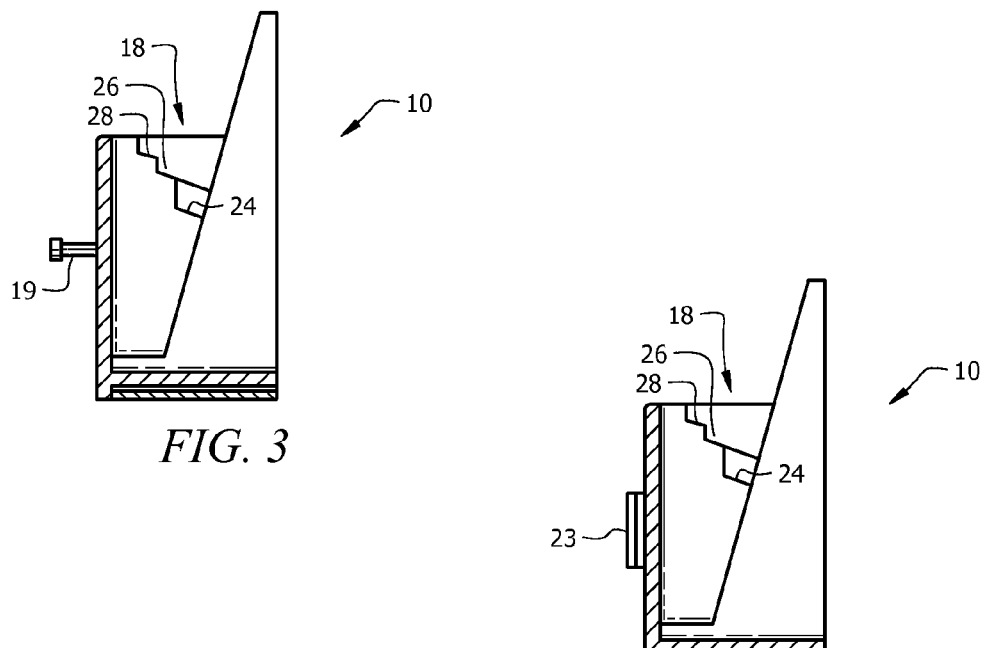
FIG. 3 illustrates a side cross-sectional view of a digital music player cradle with the first exemplary attachment mechanism.
Figure 3A:
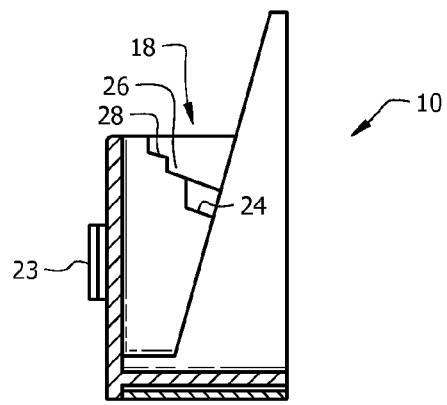
FIG. 3A illustrates a side cross-sectional view of a digital music player cradle with the second exemplary attachment mechanism.

Referring to FIGS. 3 and 3A, a cross-sectional view of a digital music player cradle 10 with attachment mechanisms are described. In this embodiment, the cavity 18 is shaped to hold the ends of three different digital music players, although any number greater than one is anticipated. An end of a larger-sized digital music player such as an Apple Corporation 80 GB iPod® or a Microsoft Corporation Zume™ fits within the outer cavity formed by a ledge 28. An end of a medium-sized digital music player such as an Apple Corporation 30 GB iPod® fits within the middle sub-cavity formed by a ledge 26. An end of a smaller-sized digital music player such as an Apple Corporation Nano® fits within the inner sub-cavity formed by a ledge 24. Although shown having three ledges 24/26/28, the present invention is not limited in the number of sizes of digital music players supported. Any number of digital music players from two digital music players is supportable by the present invention. Also, although shown fitting with Apple Corporation products, the digital music player cradle 10 is adaptable to any size and shape of digital music player. For attachment to some systems such as a Karaoke system 110 (see FIG. 10), mounting posts 19 are attached/formed on the front surface of the base 12 shown in FIG. 3. These mounting posts 19 slide into key holes 21 (see FIG. 10) on the playback system; for example, on the Karaoke system 110 (see FIG. 10). For physical attachment to audio playback system such as a Karaoke system 120 (see FIG. 12), mounting brackets 23 are attached to the front surface of the base 12 as shown in FIG. 3A. These mounting brackets 23 slide into mating mounting slots 25 (see FIG. 12) on the playback system; for example, on the Karaoke system 120 (see FIG. 12).

Figures 4, 5:
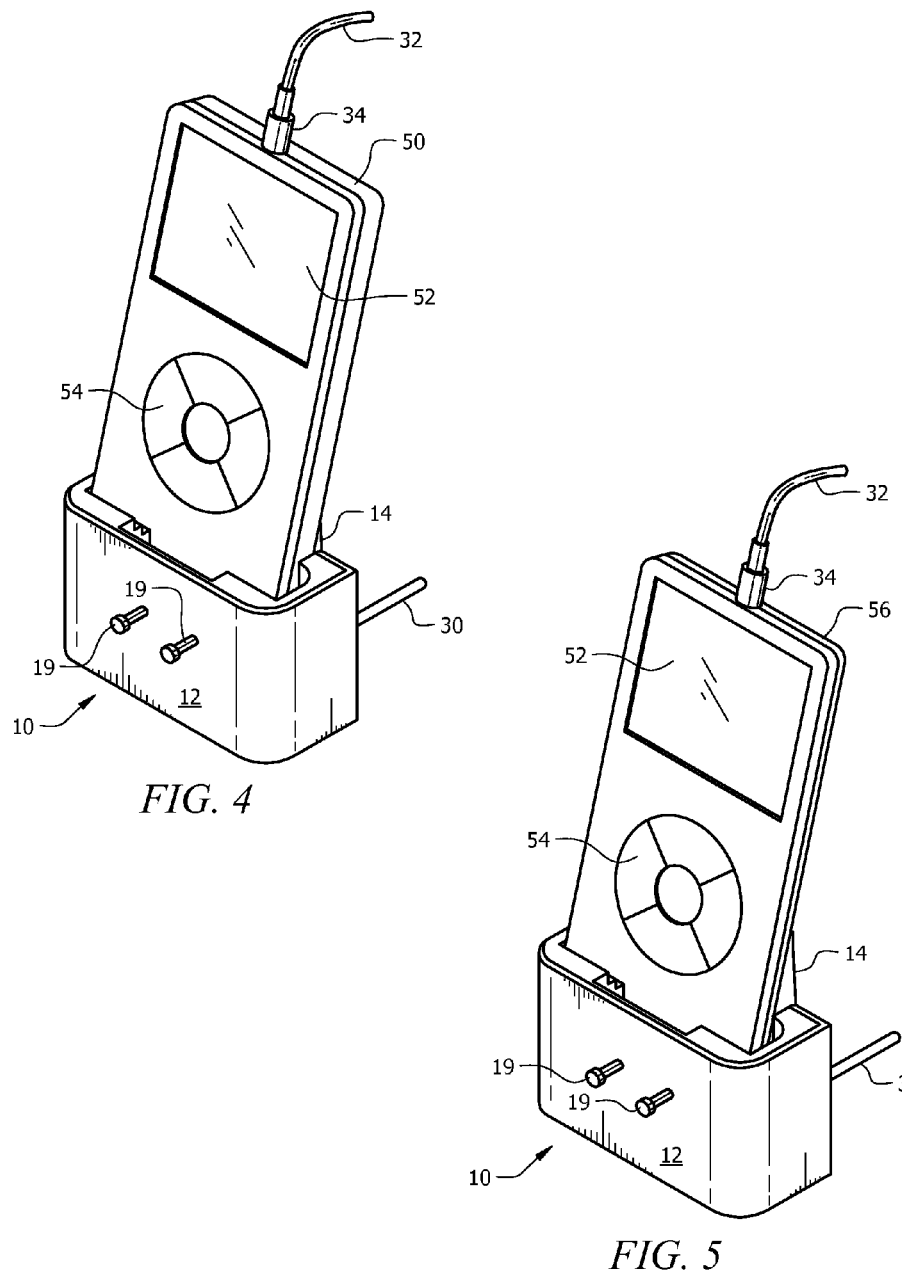
FIG. 4 illustrates an isometric view of a digital music player cradle holding a large-sized digital music player.
FIG. 5 illustrates an isometric view of a digital music player cradle holding a medium-sized digital music player.
Figure 6:
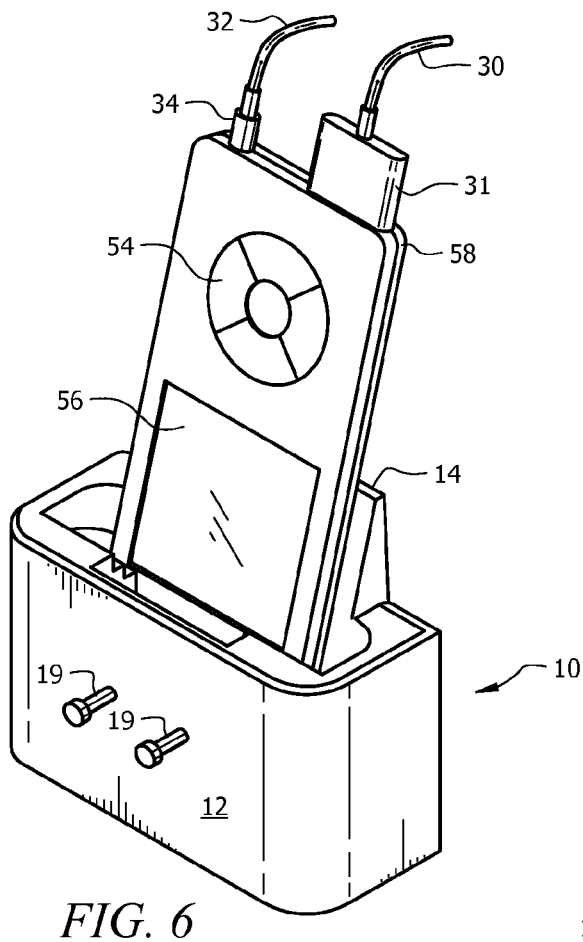
FIG. 6 illustrates an isometric view of a digital music player cradle holding a small-sized digital music player.

Referring to FIG. 4, an isometric view of a digital music player 50 cradle holding a large-sized digital music player 50 is described. In this view, a large-sized digital music player 50 such as the Apple Corporation 80 GB iPod® or a Microsoft Corporation Zume™ is shown resting within the outer sub-cavity formed by the ledge 28 and resting on the support wall 14. Many large-sized digital music players 50 have controls 54 for selecting songs, etc. and a display 52 for informing the user of various modes of operation. Also, many large-sized digital music players 50 have a connector into which a stereo headphone jack 34 with cable 32 is inserted. The data cable 30 is connected to the large-sized digital music player 50 by a connector similar to the connector 31 as shown in FIG. 6 (not visible in FIG. 4). The present invention functions with or without a data cable 30 and connector 31 attached. Likewise, the present invention functions with or without an audio cable 32 attached.

Referring to FIG. 5, an isometric view of a digital music player cradle holding a medium-sized digital music player 56 is described. In this view, a medium-sized digital music player 56 such as the Apple Corporation 30 GB iPod® is shown resting within the middle sub-cavity formed by the ledge 26 and resting on the support wall 14. Many medium-sized digital music players 56 have controls 54 for selecting songs, etc. and a display 52 for informing the user of various modes of operation. Also, many medium-sized digital music players 56 have a connector into which a stereo headphone jack 34 with cable 32 is inserted. The data cable 30 is connected to the medium-sized digital music player 56 by a connector similar to the connector 31 as shown in FIG. 6 (not visible in this figure).

Referring to FIG. 6, an isometric view of a digital music player cradle holding a small-sized digital music player is described. In this view, a smaller-sized digital music player 58 such as the Apple Corporation Nano® is shown resting within the inner sub-cavity formed by the ledge 24 and resting on the support wall 14. In such a position, the smaller-sized digital music player 58 is supported with the controls facing forward and accessible while in the cradle 10. Many smaller-sized digital music players 58 have controls 54 for selecting songs, etc. and a display for informing the user of various modes of operation 52. Also, many smaller-sized digital music players 58 have a connector into which a stereo headphone jack 34 with cable 32 is inserted. The data cable 30 is connected to the smaller-sized digital music player 58 by a connector 31. The present invention functions with or without a data cable 30 and connector 31 attached. Likewise, the present invention functions with or without an audio cable 32 attached. For some digital music players such as the smaller-sized digital music player 58, the orientation of the data connector 31 makes it difficult to rest properly in an upright position within the digital music player cradle 10. In such cases, the smaller-sized digital music player 58 rests in an upside-down configuration as shown in FIG. 6, still providing the benefit of supporting the smaller-sized digital music player 58.

Figure 7:
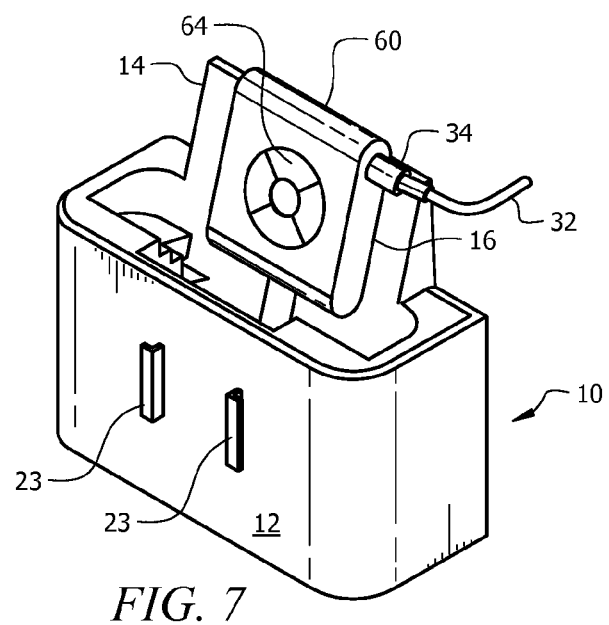
FIG. 7 illustrates an isometric view of a digital music player cradle holding a micro-sized digital music player.

Referring to FIG. 7, an isometric view of a digital music player cradle holding a micro-sized digital music player is described. Some micro-sized (or clip-on) digital music players 60 are very small and are designed to clip onto a user's clothing. Often, these micro-sized digital music players 60 such as the Apple Corporation Mini, have no display and only a control 64 for initiating the playing of audio, etc. To support micro-sized digital music players 60, a pair of front clip indentations 16 and a pair of rear clip indentations 17 are provided. Using these clip indentations 16/17, a clip of the micro-sized digital music player 60 clips onto the support wall 14 and the edges of each side of the micro-sized digital music player's 60 clip is held within the clip indentations 16/17. Without the clip indentations, the micro-sized digital music player's 60 clip would not stay in place, especially if the digital music player cradle 10 is made from a slippery, plastic material. As stated previously, the present invention functions with one set of clip indentations 16/17, two sets of clip indentations 16/17 and without any clip indentations 16/17, depending upon the types and styles of digital music players supported and the materials used for the cradle 10.

Figure 8:
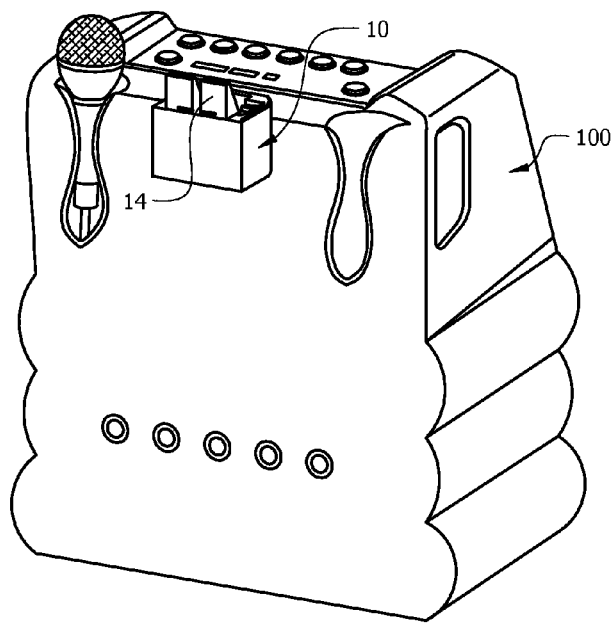
FIG. 8 illustrates a rear isometric view of a digital music player cradle attached to a Karaoke system.
Figure 9:
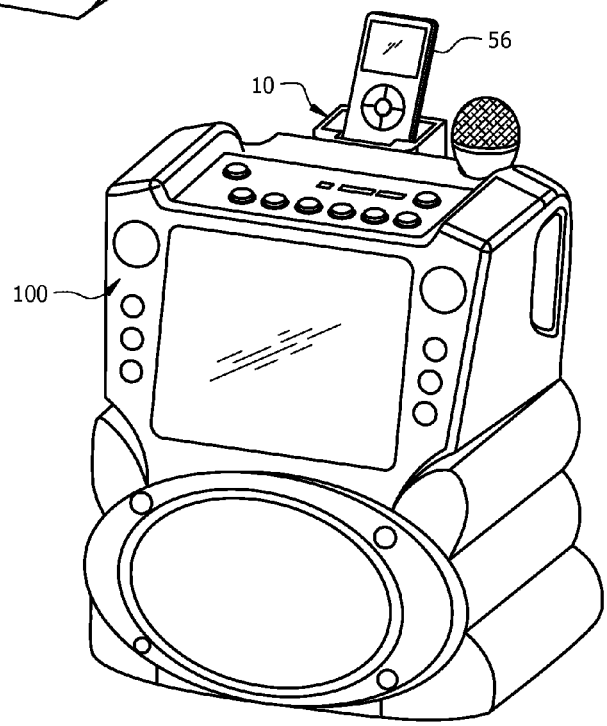
FIG. 9 illustrates a front isometric view of a digital music player cradle attached to a Karaoke system with an exemplary digital music player inserted.

Referring to FIGS. 8 and 9, a rear and front isometric view of a digital music player cradle attached to a Karaoke system are shown. In this embodiment, the digital music player cradle 10 is part of and/or permanently affixed to the back surface of a music system such as a Karaoke system 100. In some embodiments, the cradle 10 is molded as part of the music system 100 while in other embodiments, the cradle 10 is affixed to the back surface of the music system 100 using glue, fasteners, ultrasonic welding, etc.

Figure 10:
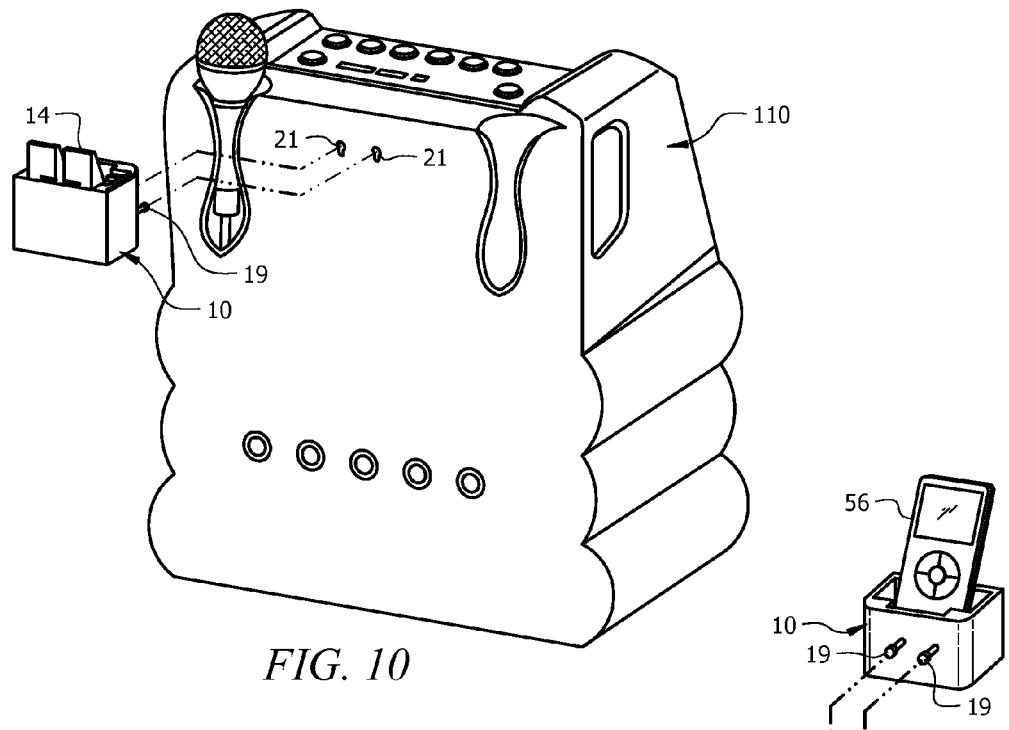
FIG. 10 illustrates a rear isometric view of a Karaoke system showing the attachment of a digital music player cradle by the first exemplary attachment mechanism.
Figure 11:
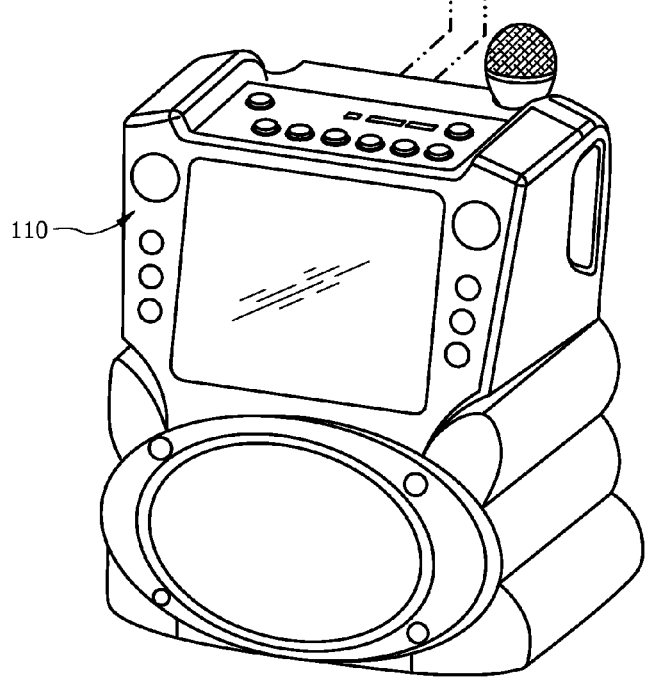
FIG. 11 illustrates a front isometric view of a Karaoke system showing the attachment of a digital music player cradle by the first exemplary attachment mechanism.

Referring to FIGS. 10 and 11, a rear and front isometric view of a Karaoke system 110 are shown. In this example, the first exemplary attachment mechanism is used to attach the digital music player cradle 10 to a music system such as a Karaoke system 110. In such, the digital music player cradle 10 has a plurality of keys 19 that mate with key holes 21 in the Karaoke system 110. Alternately, it is anticipated that the keys 19 are on the Karaoke system 110 and the key holes 21 are in the digital music player cradle 10. It is preferred that the keys 19 are on the digital music player cradle 10 and the key holes 21 are in the Karaoke system 110 because replacement of the digital music player cradle 10 is of lower cost should a key 19 break off.

Referring to FIGS. 12 and 13, a rear and front isometric view of a Karaoke system 120 are shown. In this example, the second exemplary attachment mechanism is used to attach the digital music player cradle 10 to a music system such as a Karaoke system 120. In such, the digital music player cradle 10 has a plurality of mounting brackets 23 that mate with mating mounting slots 25 in the Karaoke system 120. Alternately, it is anticipated that the mounting brackets 23 are on the Karaoke system 120 and the mating mounting slots 25 are in the digital music player cradle 10. It is preferred that the mounting brackets 23 are on the digital music player cradle 10 and the mating mounting slots 25 are in the Karaoke system 120 because replacement of the digital music player cradle 10 is of lower cost should a mounting brackets 23 break off.

Referring to FIG. 14, a rear isometric view of a music system (Karaoke system) 120 showing the attachment of a digital music player cradle 10 in an alternate position for storage when not in use is shown. Although not required, the mounting mechanism 19/21/23/25 is symmetrical (as in FIGS. 10-13) such that the digital music player cradle 10 mates with the music system (e.g. Karaoke system 110/120) upright or inverted. The inverted position is useful for storing the digital music player cradle 10 when not in use.

Equivalent elements can be substituted for the ones set forth above such that they perform in substantially the same manner in substantially the same way for achieving substantially the same result.

It is believed that the system and method and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A digital music player cradle for supporting a plurality of digital music players of different sizes onto a sound system, the digital music player cradle comprising:
   a base;
   a cavity in an upper surface of the base, the cavity accepts an end portion of a largest digital music player of the plurality digital music players;
   a support wall extending from an upper rear surface of the base for supporting one of the digital music players;
   a plurality of ledges within the cavity, the ledges forming decreasingly sized sub-openings towards a bottom of the cavity, whereas each sub-opening is sized corresponding to a different one of the plurality of digital music players;
   an attachment mechanism on a front surface of the base, the attachment mechanism connecting with a mating attachment mechanism on the sound system, thereby holding the digital music player cradle to the sound system.

2. The digital music player cradle of claim 1, wherein the multiple digital music players consists of a large-sized digital music player, a medium-sized digital music player and a small-sized digital music player.

3. The digital music player cradle of claim 1, wherein the support wall has at least one front-clip indentation running substantially horizontal on a front surface for supporting a clip-on digital music player.

4. The digital music player cradle of claim 1, wherein the attachment mechanism is a plurality of mounting brackets on the digital music player cradle and a plurality of mating slots on the music system.

5. The digital music player cradle of claim 1, wherein the attachment mechanism is a plurality of mounting posts on the digital music player cradle and a plurality of mating key holes on the music system.

6. The digital music player cradle of claim 1, wherein the attachment mechanism on a front surface of the base and the mating attachment mechanism on the sound system hold the digital music player cradle to the sound system in two positions, an upright position and an opposite position.

7. A method of supporting multiple digital music players in a sound system, the method comprising:
   providing a digital music player cradle for supporting any one digital music player of the multiple digital music players, the digital music player cradle comprising:
      a base;
      a cavity in an upper surface of the base, the cavity accepts and holds an end portion of a largest digital music player of the multiple digital music players;
      a support wall extending from an upper rear surface of the base for supporting one of the multiple digital music players at a time;
      a plurality of ledges within the cavity, the ledges forming decreasingly sized sub-openings towards a bottom of the cavity, whereas each ledge/sub-opening is sized to hold a different one of the multiple digital music players;
      an attachment mechanism on a front surface of the base, the attachment mechanism connecting with a mating attachment mechanism on the sound system, thereby holding the digital music player cradle to the sound system;
   interfacing the attachment mechanism to the mating attachment mechanism, thereby attaching the base of the digital music player cradle to the sound system;

connecting a first digital music player of the multiple digital music players to a first end of a data cable, a second end of the data cable connected to the sound system;

inserting a first end of the first digital music player into the cavity resting in a first sub-opening of the sub-openings, a back side of the first digital music player resting against the support wall;

removing the first digital music player from the cavity;

disconnecting first end of the data cable from the first digital music player;

connecting a second digital music player of the multiple digital music players to the first end of the data cable, the second digital music player having a different size than the first digital music player; and inserting a first end of the second digital music player into the cavity in a second sub-opening of the sub-openings, a back side of the second digital music player resting against the support wall.

8. The method of claim 7, wherein the first digital music player is a large-sized digital music player and the second digital music player is a small-sized digital music player.

9. The method of claim 7, wherein the support wall has at least one front-clip indentation running substantially horizontal on a front surface for supporting a clip-on digital music player and the support wall has at least one rear-clip indentation running substantially horizontal on a back surface for supporting the clip-on digital music player.

10. The method of claim 7, wherein the sound system is a Karaoke system.

11. The method of claim 7, wherein the sound system is a computer system and the data cable is a Universal Serial Bus cable for connecting to a computer system.

12. A digital music player cradle for supporting multiple digital music players, the digital music player cradle comprising:

a base;

a means for accepting an end portion of a digital music player of the multiple digital music players;

a means for supporting the digital music player extending from an upper surface of the base;

a stepped means for supporting the multiple digital music players within the means for supporting the digital music player, the stepped means for supporting the multiple digital music players including ledges that form decreasing sized sub-openings towards a bottom of the means for supporting the digital music player, whereas each sub-opening is sized to hold a different one of the multiple digital music players; and a means for removably attaching the base to a sound system.

13. The digital music player cradle of claim 12, wherein the multiple digital music players consists of a large-sized digital music player, a medium-sized digital music player and a small-sized digital music player.

14. The digital music player cradle of claim 12, wherein the means for removably attaching the base to a sound system is a plurality of mounting brackets on the digital music player cradle and a plurality of mating slots on the music system.

15. The digital music player cradle of claim 12, wherein the means for removably attaching the base to a sound system is a plurality of mounting posts on the digital music player cradle and a plurality of mating key holes on the music system.

16. The digital music player cradle of claim 12, wherein the means for removably attaching the base to a sound system is hook material on the digital music player cradle and a loop material on the music system.

17. The digital music player cradle of claim 12, wherein the data cable is a Universal Serial Bus cable for connecting to a computer system.

18. The digital music player cradle of claim 12, wherein the sound system is a Karaoke system.

19. The digital music player cradle of claim 12, wherein a first digital music player of the multiple digital music players is wider than a second digital music player of the multiple digital music players.

20. The digital music player cradle of claim 12, wherein a first digital music player of the multiple digital music players is thicker than a second digital music player of the multiple digital music players.

* * * * *